United States Patent
Madhavapeddi et al.

(10) Patent No.: US 9,477,971 B2
(45) Date of Patent: *Oct. 25, 2016

(54) PROVIDING CONTEXTUAL INFORMATION FOR SPOKEN INFORMATION

(71) Applicant: Nuance Communications, Inc., Burlington, MA (US)

(72) Inventors: Shreedhar Madhavapeddi, Seattle, WA (US); John F. Pollard, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/053,490

(22) Filed: Oct. 14, 2013

(65) Prior Publication Data

US 2014/0046770 A1 Feb. 13, 2014

Related U.S. Application Data

(63) Continuation of application No. 13/170,463, filed on Jun. 28, 2011, now Pat. No. 8,560,323, which is a continuation of application No. 11/840,174, filed on Aug. 16, 2007, now Pat. No. 7,970,608.

(60) Provisional application No. 60/822,910, filed on Aug. 18, 2006.

(51) Int. Cl.
*G10L 15/00* (2013.01)
*H04M 3/00* (2006.01)
(Continued)

(52) U.S. Cl.
CPC ...... *G06Q 30/0267* (2013.01); *G06Q 30/0241* (2013.01); *G06Q 30/0251* (2013.01);
(Continued)

(58) Field of Classification Search
CPC ....... G10L 15/00; G10L 15/08; G10L 15/26; G10L 15/265; G10L 2015/228; H04M 2201/40; H04M 1/271; H04M 3/473; H04M 3/533; H04M 3/4878; G06Q 30/02; G06Q 30/0207; G06Q 30/0241
USPC ............ 704/235, 275, 231; 705/14.4, 14.67; 379/88.01, 88.04, 88.08, 88.12, 88.22, 379/114.13, 114.1
See application file for complete search history.

(56) References Cited

U.S. PATENT DOCUMENTS 6,029,063 A 2/2000 Parvulescu et al.
6,571,279 B1 5/2003 Herz et al.
(Continued)

OTHER PUBLICATIONS

International Search Report and Written Opinion for Application PCT/US07/18281; Applicant Jott Networks, Inc., mail date Oct. 14, 2008; 11 pages.

*Primary Examiner* — Paras D Shah
(74) *Attorney, Agent, or Firm* — Perkins Coie LLP

(57) ABSTRACT

Techniques are described for providing relevant information to users (e.g., information that is at least potentially of interest to the users). Relevant information for a user may be automatically determined based on a determined context of the user and/or on a request for that information from the user. For example, voice-based information may be obtained from a user in one or more ways, and then analyzed to identify requests or other indications of information of interest and/or to otherwise determine a context of the user that corresponds to potential information of interest. Relevant information for a user may be provided to the user in various ways, such as via a voice-based response during a telephone call and/or via one or more electronic messages sent to the user (e.g., via emails, instant messages, paging messages, SMS or other text messages, etc.).

20 Claims, 16 Drawing Sheets

Sequence of events in a voice memo resulting in an optional advertising offer

(51) Int. Cl.
  *G06Q 30/02* (2012.01)
  *H04M 3/487* (2006.01)
  *H04M 3/533* (2006.01)

(52) U.S. Cl.
  CPC ....... *H04M3/4878* (2013.01); *H04M 3/53366* (2013.01); *H04M 2201/40* (2013.01); *H04M 2203/353* (2013.01); *H04M 2203/4518* (2013.01); *H04M 2207/18* (2013.01)

(56) References Cited

U.S. PATENT DOCUMENTS

| | | | |
|---|---|---|---|
| 6,775,360 B2 * | 8/2004 | Davidson et al. | 379/88.14 |
| 6,868,384 B2 | 3/2005 | Parus et al. | |
| 7,158,621 B2 | 1/2007 | Bayne | |
| 7,187,761 B2 * | 3/2007 | Bookstaff | 379/201.01 |
| 7,400,711 B1 * | 7/2008 | Ford et al. | 379/70 |
| 7,536,171 B2 | 5/2009 | Frank et al. | |
| 7,805,740 B2 | 9/2010 | Gilboa et al. | |
| 7,873,536 B2 * | 1/2011 | Desikan et al. | 705/14.1 |
| 7,933,388 B1 | 4/2011 | Vanier et al. | 379/67.1 |
| 7,961,861 B2 * | 6/2011 | Kliger | 379/201.01 |
| 7,970,608 B2 | 6/2011 | Madhavapeddi et al. | |
| 8,023,622 B2 * | 9/2011 | Timmins et al. | 379/88.13 |
| 8,364,521 B2 | 1/2013 | Ramer et al. | |
| 8,560,323 B2 | 10/2013 | Madhavapeddi et al. | |
| 2004/0117255 A1 | 6/2004 | Nemirofsky et al. | |
| 2004/0240646 A1 | 12/2004 | O'Donnell | |
| 2005/0015256 A1 | 1/2005 | Kargman | |
| 2005/0125286 A1 | 6/2005 | Crippen et al. | |
| 2005/0180549 A1 | 8/2005 | Chiu et al. | |
| 2006/0171520 A1 | 8/2006 | Kliger | |
| 2007/0078708 A1 | 4/2007 | Yu et al. | |
| 2007/0078709 A1 * | 4/2007 | Rajaram | G06Q 30/02 705/14.71 |
| 2007/0116227 A1 | 5/2007 | Vitenson et al. | |
| 2007/0162296 A1 * | 7/2007 | Altberg et al. | 705/1 |
| 2007/0201636 A1 | 8/2007 | Gilbert et al. | |
| 2007/0203901 A1 * | 8/2007 | Prado | G06Q 30/02 |
| 2007/0239529 A1 | 10/2007 | Baluja et al. | |
| 2007/0239531 A1 * | 10/2007 | Beaufays et al. | 705/14 |
| 2007/0266101 A1 | 11/2007 | Patel et al. | |
| 2007/0274483 A1 | 11/2007 | Shapiro | |
| 2007/0274484 A1 * | 11/2007 | Frank et al. | 379/114.13 |
| 2007/0276926 A1 | 11/2007 | LaJoie et al. | |
| 2008/0177616 A1 | 7/2008 | Nemirofsky et al. | |

* cited by examiner

Sequence of events in call-to-action advertising for a registered user

Sequence of events in call-to-action advertising for unregistered users on Television or Radio stations Sequence of events in call-to-action advertising for registered users in print media.

Sequence of events in call-to-action advertising for unregistered users in print media Sequence of events in a voice memo resulting in an optional advertising offer Sequence of events in a directory assistance request from users Call to Action Advertising in broadcast media for registered users Call-to-action advertising in broadcast media for unregistered users Call to Action Advertising in print media for registered users Call-to-action advertising in print media for unregistered users Detailed flow of information when a user leaves a voice memo Detailed flow of information in a Directory Assistance scenario

PROVIDING CONTEXTUAL INFORMATION FOR SPOKEN INFORMATION

CROSS-REFERENCE TO RELATED APPLICATION(S)

This application is a continuation of U.S. patent application Ser. No. 13/170,463, filed Jun. 28, 2011, entitled "Providing Contextual Information for Spoken Information," now U.S. Pat. No. 8,560,323, which is a continuation of U.S. patent application Ser. No. 11/840,174, filed Aug. 16, 2007, now U.S. Pat. No. 7,970,608, which claims the benefit of provisional U.S. Patent Application No. 60/822,910, filed Aug. 18, 2006 and entitled "Contextual Voice Based Advertising System And Method," each of which is hereby incorporated by reference in its entirety.

TECHNICAL FIELD

The following disclosure relates generally to techniques for providing contextually relevant information based on spoken information, such as to provide promotional information to users of a voice-based messaging system.

BACKGROUND

While people are increasingly using data retrieval capabilities of computing devices to access information of a variety of types, voice-based functionality of telephones continues to be commonly used for a variety of purposes, including to obtain information of various types. For example, telephones are frequently used to obtain address and telephone number information for designated individuals or businesses, such as via automated and/or manual directory assistance services. In addition, enhanced directory assistance services exist to provide a variety of types of additional information to telephone users, such as movie listings, weather reports, sports scores, traffic reports, etc. Moreover, some businesses may provide automated telephone systems to provide various information to customers and/or partners about their businesses, such as via Interactive Voice Response ("IVR") systems. Other types of systems may similarly provide a variety of other types of functionality to voice-based telephone users, such as voice message recording and/or forwarding services (e.g., to record a voice message to later be provided to one or more designated recipients), transcription services (e.g., to record voice-based information that will later be manually and/or automatically converted into text), etc. While various services and systems thus exist for telephone users to obtain some types of voice-based information, it is nonetheless often difficult for telephone users to obtain a variety of other types of information of interest in a desired manner.

In addition, it is often difficult for companies and other entities that wish to provide promotional and other types of information to others to do so in an effective manner. For example, while a variety of types of advertising models are known (e.g., via traditional print media; radio; television; billboards; Internet-based banner ads and sponsored links and pop-up ads; location-based services, such as via data services of mobile devices; etc.), all suffer from various known problems, including difficulties in providing information to users that is currently of interest and in a form and/or manner that is desired.

DETAILED DESCRIPTION

Figure 1:
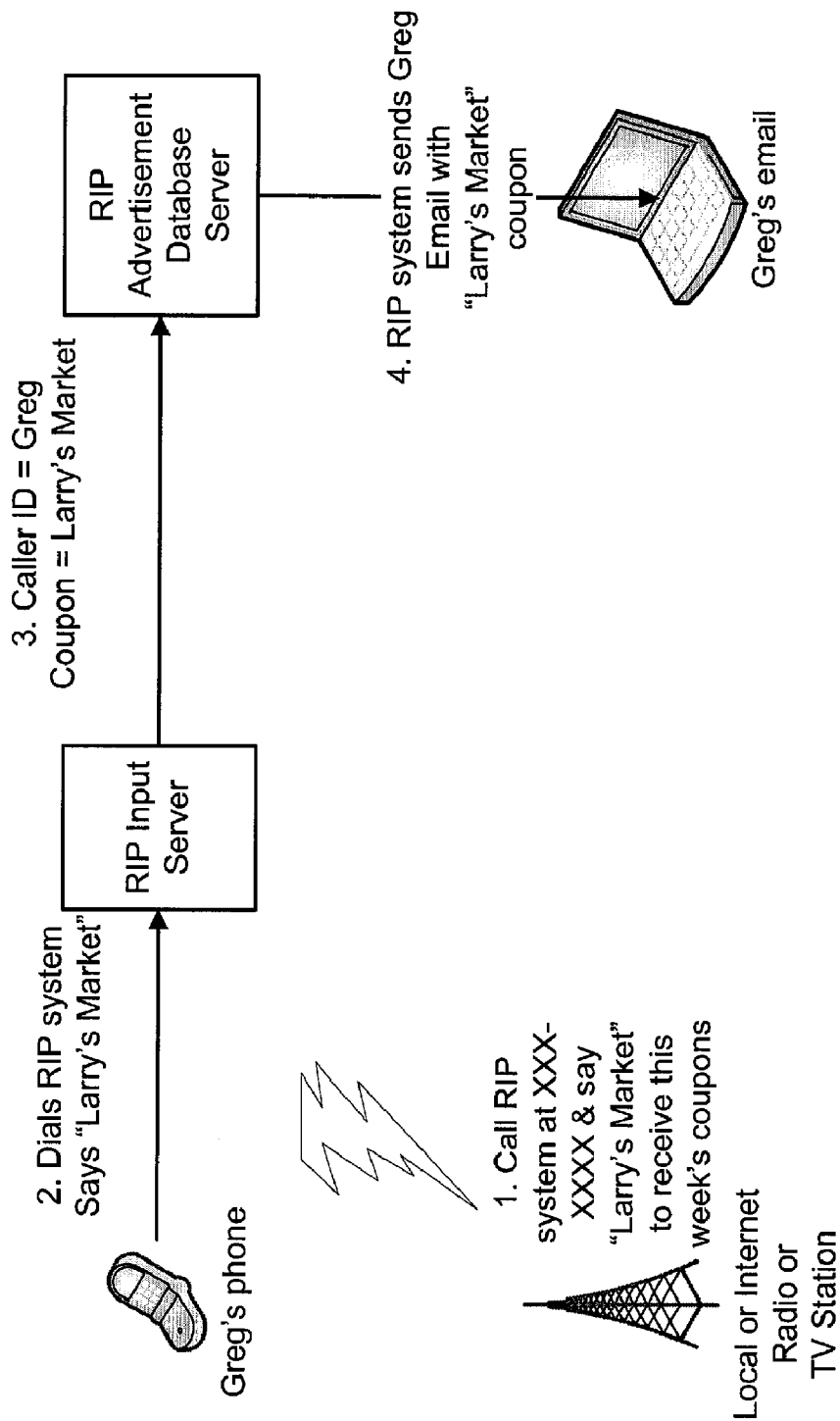
FIGS. 1-6 illustrate examples of some types of interactions to provide users with relevant information.

Techniques are described for providing information to users that is relevant to the users (e.g., information that is potentially of interest to the users), such as to reflect current contextual situations of the users. In some embodiments, the techniques include automatically determining relevant information for a user based on a determined context of the user, while in other embodiments relevant information for a user may be identified based on a request for or other indication of that information that is obtained from the user. For example, in at least some embodiments, spoken information is obtained from a user in one or more ways, and the spoken voice-based information is analyzed to identify requests or other indications of information of interest and/or to otherwise determine a context of the user that corresponds to potential information of interest. When relevant information for a user is determined, the information may be provided to the user in various ways, such as via a spoken voice-based response (e.g., immediately, such as during a telephone call with the user and in response to a spoken request or other spoken information from the user) and/or via one or more electronic messages sent to the user (e.g., via one or more emails, instant messages, paging messages, SMS or other text messages, etc.). Additional details are included below related to determining relevant information for user and providing relevant information to users. In addition, in at least some embodiments, a Relevant Information Provider ("RIP") system automatically performs some or all of the described techniques, as described in greater detail below.

Information that is available to be provided to users may be determined and obtained in various ways in various embodiments. In at least some embodiments, businesses and other entities (e.g., providers of products, such as manufacturers, distributors, retailers, etc.) may have information that they desire to provide to appropriate users, such as advertisements or other promotional materials (e.g., coupons, discount or promotional codes, samples, etc.). If so, such entities may provide their promotional information to an embodiment of the RIP system in various ways, such as via an API ("application programming interface") provided by the RIP system. Entities may further specify particular promotional information and indicate one or more criteria under which that promotional information is to be provided to particular users in at least some embodiments, such as information about the users (e.g., demographic information, location information, etc.), information about one or more times at which the promotional information is to be provided, etc. As one example, an entity may be allowed to specify a particular target expression (e.g., individual words, phrases, sounds, etc.) for a particular group or piece of promotional information, such that the promotional information is to be provided to users who request information about the target expression and/or to users who use the target expression as part of spoken information obtained from the user. Entities who wish to provide promotional information to users may further be charged various fees in various situations, such as a flat fee, or a fee for each that the promotional information is provided to a user (e.g., by allowing an entity to bid on or otherwise specify a price for a target expression, which the entity then pays each time that the promotional information is provided to a user who uses the target expression).

In at least some embodiments, a determination of relevant information for a user is performed based on spoken voice-based information obtained from the user. For example, a user may place a telephone call to an IVR system or other automated voice-based system (e.g., via a cell phone; a landline phone; a satellite phone; a phone that uses one or more computer networks at least in part, such as for Voice Over IP ("VoIP"); etc.), such as to request particular information (e.g., via a provided voice-based request) and/or to provide spoken information that may be used to determine information about a context of the user. The provided spoken information may be analyzed to determine whether particular promotional or other information is likely to be relevant for that spoken information. As one specific example, if an entity has associated particular promotional information with a particular target expression, and the user uses the target expression in the provided spoken information, that promotional information may be determined to be relevant to the user. If the provided spoken information from a user is intended for one or more recipients other than the user (e.g., as a message to those recipients), the determined relevant information may be provided to some or all of the recipients, whether instead of or in addition to the user.

In some embodiments, the RIP system may operate in conjunction with one or more affiliated systems that provide one or more types of voice-based functionality to users (e.g., with third-party systems in exchange for a fee), while in other embodiments the RIP system may itself provide one or more types of voice-based functionality to users. A non-exclusive list of types of voice-based functionality that may be provided in at least some embodiments to users, such as via a telephone call initiated by a user, include the following: the ability to create voice memos or other messages intended for the user and/or one or more other recipients; directory services; and the ability to use a phone call to check for coupons and/or in response to advertising in broadcast and/or user-directed media (e.g., radio, television, newspapers, magazines, billboards, online information, etc., whether local or regional/national). In some embodiments, the voice-based functionality may be available only to users who have a predefined relationship with the RIP system and/or an affiliated system, such as registered subscriber or member users who have created an account and provided one or more of various types of information about themselves (e.g., a user name; an actual name; a password; electronic message address information for the user, such as an email address, instant message address, fax number, paging number, and/or telephone number for SMS or other text messages; other contact information; demographic information; information about one or more user phone numbers from which the user will contact the RIP system and/or affiliated system; etc.), as well as in some embodiments paying a fee. In other embodiments, the voice-based functionality may be available to all users. In addition, the RIP system and/or affiliated system may provide one or more telephone numbers that users may call to receive the voice-based functionality, such as toll-free numbers that provide information to the RIP system and/or affiliated system about a calling user's telephone number and/or other caller ID information.

The RIP system may provide relevant information to users in various ways. For example, the information may be provided in voice form in some embodiments, such as during a telephone call made by the user that initiates the providing of the relevant information and/or during a later telephone call. In other embodiments, the RIP system may send the information to a telephone caller user in one or more electronic messages, such as if the user is a registered user that has previously provided electronic message address information to be used and the RIP system can identify a telephone caller as a particular registered user (e.g., via use of caller ID or related information that is available about the caller user, via login or other related information explicitly provided by the user, etc.), or if such address information is otherwise available. Furthermore, in some embodiments the RIP system may store the relevant information for later retrieval by a user, such as via a Web site provided by the RIP system.

The use of the described techniques provide various benefits to users who receive relevant information via the RIP system and to entities who make information available to be provided to the users via the RIP system. Non-exclusive examples of some such benefits in at least some embodiments include the following: the ability of users to obtain relevant information for a context of the user; the ability of users to obtain information in a desired form; the ability of users to shield their identity and/or other personal information from advertisers, marketers, businesses and other entities while obtaining requested information or other relevant information related to the entities, such as to request marketing or general information in an anonymous fashion; and the ability of advertisers, marketers, businesses and other entities to target particular information to particular information recipients.

For illustrative purposes, some embodiments are described below in which particular types of information is determined to be relevant for particular types of users in particular ways, and is provided to the users in particular ways. These examples are provided for illustrative purposes and are simplified for the sake of brevity, and the inventive techniques can be used in a wide variety of other situations, some of which are discussed below. For example, in some embodiments, voice-based information may be obtained from users in other manners than via an automated voice system that the users contact, such as by human operators that received the voice-based information from the users and/or in situations in which the users are contacted via telephone. In addition, in some embodiments, information used to determine relevant information for a user is obtained from the user in a form other than voice-based information, such as text-based information.

In at least some of the example scenarios described below, users respond to advertisements in broadcast media, such as for a particular product (e.g., service and/or a physical good) that they would like to know more about (e.g., by obtaining relevant information such as marketing information, product detail, directions, discount coupons, etc.). Furthermore, specific example embodiments of an RIP system are described below with reference to one or more example registered and unregistered users of the RIP system (using example user "Greg" as both a registered user and unregistered user in different example scenarios), although in other embodiments the RIP system may include more and/or less functionality and users may perform other types of actions. In at least some of the examples discussed below, an example embodiment of the RIP system includes a front-end RIP Input Server computing system that interacts with users to obtain voice-based information and a distinct RIP Advertising Database Server computing system that supports the RIP Input Server system to identify particular relevant information for a user based on obtained voice-based information, but in other embodiments the RIP system may be implemented in other manners (e.g., as part of a single computing system).

In the example scenario illustrated in FIG. 1, the caller user is a registered RIP system user whose phone number and email address are previously specified to the RIP system. So, when he calls the example RIP system, it automatically recognizes his phone number and is able to directly deliver a relevant advertising coupon to his email account.

In particular, in this example, Greg listens to or sees an advertisement over the radio or television for a good or service he is interested in, and contacts the RIP system to obtain additional information related to the good/service and/or to the advertisement, although in other embodiments may see such an advertisement via any other mechanism.

Greg dials a phone number provided by the RIP system that could be mentioned in the advertising or otherwise known to Greg (e.g., based on the previous registration process), and says an expression corresponding to the advertisement (e.g., "Larry's Market"), such as an expression that the advertisement indicates to be used during the call. The RIP Input Server recognizes the expression provided by Greg, and informs Greg that he will be sent information corresponding to the advertisement via his registered email address.

The RIP Input Server forwards Greg's message and/or an indication of the recognized expression to the RIP Advertisement Database Server that stores promotional information about Larry's Market.

This promotional information is then forwarded to Greg's email address. In other embodiments, the promotional information may be sent in other manners, such as by sending one or more electronic messages other than emails, and/or by sending related information other than the promotional information (e.g., instructions for accessing the promotional information from another location and/or a user-selectable link to obtain the promotional information). Greg can then take this promotional information (e.g., a discount coupon) to a Larry's Market store in his neighborhood in order to receive a discount or obtain another benefit, or in other embodiments may use the information in other manners (e.g., via an online interaction with a Web site for Larry's Market).

Figure 2:
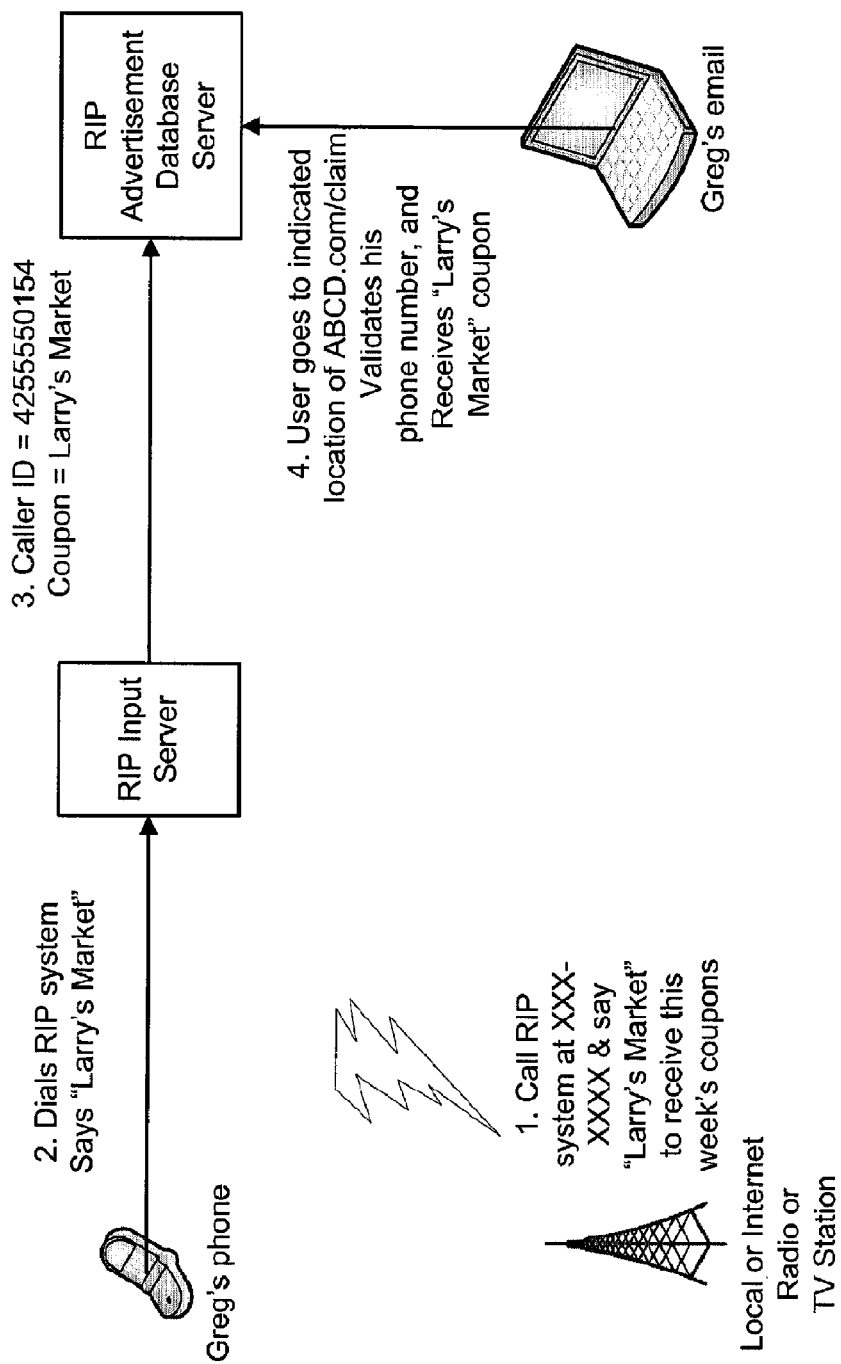

In the example scenario of FIG. 2, the caller user is not a registered RIP system user (or is a registered RIP system user but is calling from a phone that is not previously associated with his account), and thus his phone number and email address are not known by the RIP system or associated with the caller. Accordingly, when the user calls the RIP system, his caller identity information may in at least some situations be obtained, but corresponding electronic message address information is not known for the user unless it is explicitly obtained from the user during the call. Instead, in this example, the relevant information that is requested by or otherwise determined for the user during the call is stored in a specific accessible location, and the caller is informed during the call how to access the stored information. In this example embodiment, the actual relevant information is not shared with the user until he validates that the phone belongs to him, although in other embodiments or situations such validation may not be performed, or other types of validation may be used (e.g., to provide the relevant information to the user only after the user becomes a registered RIP system user).

In particular, in this example, Greg listens to or sees an advertisement over the radio or television for a good or service he is interested in, although in other embodiments may receive such an advertisement via any other mechanism.

Greg dials a phone number provided by the RIP system that could be mentioned in the advertising or otherwise known to Greg, and says an expression corresponding to the advertisement (e.g., "Larry's Market"). The RIP Input Server recognizes the expression provided by Greg, but doesn't recognize Greg as a registered user. Therefore, the RIP Input Server tells Greg to visit a particular part of a Web site provided by the RIP system (e.g., ABCD.com/claim) to retrieve the relevant information, and may further in some embodiments provide additional details regarding how to access the information (e.g., a particular password or code to use to obtain the information). The RIP Input Server may also in some embodiments send a text message to the phone that Greg used for the call to remind him of the location of the information requested, such as in addition to or instead of providing the information in a voice-based manner during the call.

The RIP Input Server forwards Greg's Caller ID and an indication of the recognized expression to the RIP Advertisement Database Server, which stores promotional information about Larry's Market.

In this example, after Greg visits the indicated Web site address (e.g., from a computing system separate from his telephone, or from the same telephone if it provides both voice-based and data-based information retrieval capabilities) and enters the phone number he initially called from, he receives the relevant information (e.g., a discount coupon, such as for use at a physical Larry's Market store in his neighborhood and/or online in order to receive a discount or obtain another benefit). In other embodiments and situations, such as depending on the advertiser's preference, Greg may receive the relevant information only after validating his ownership of this phone or otherwise providing additional information.

Figure 3:
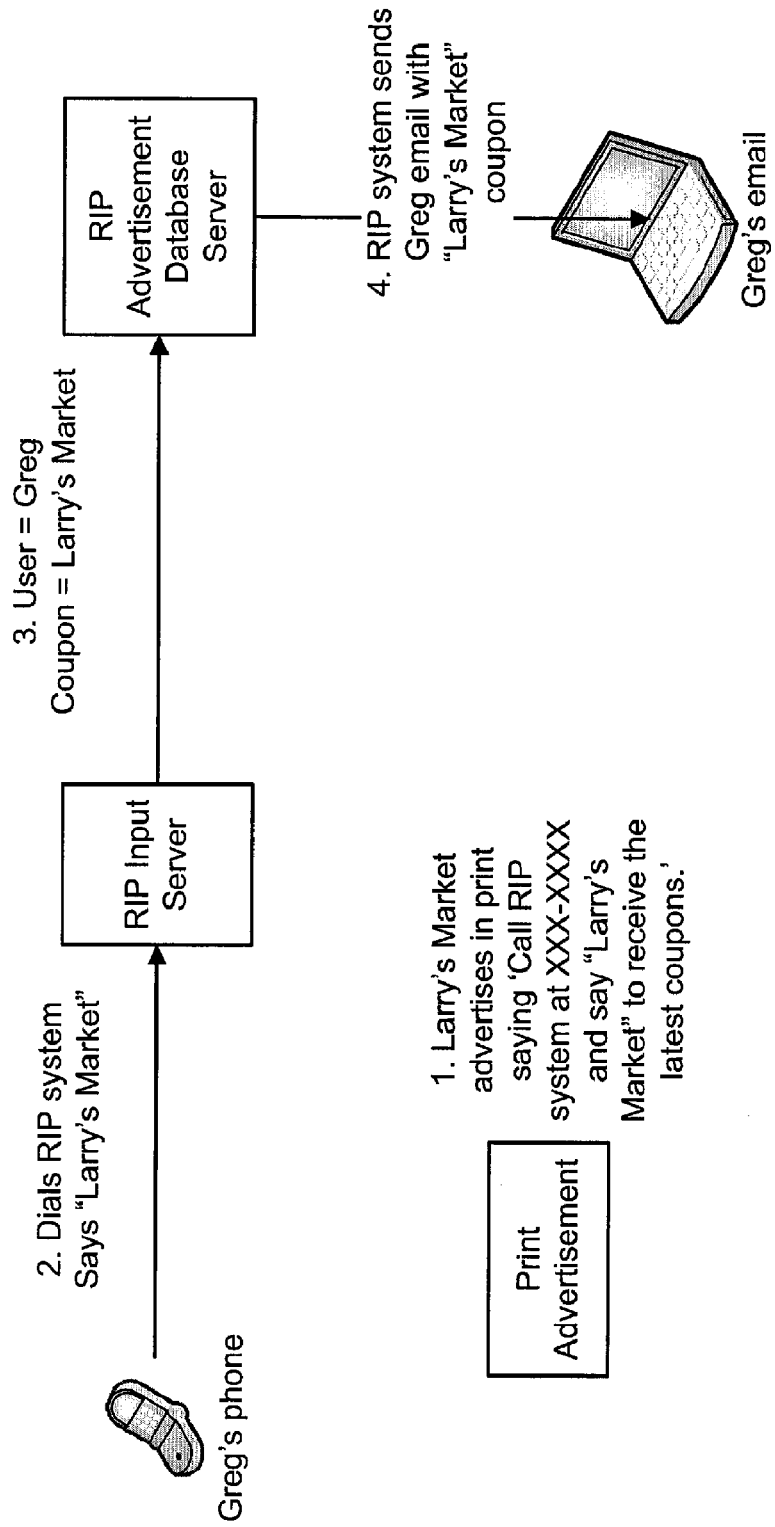

In FIG. 3, the caller user is a registered RIP system user, similarly to FIG. 1, but in this example is calling in response to an advertisement in print media (e.g., mass-market print media, such as a newspaper, magazine, etc. that is provided to a city, region, or nation).

In particular, in this example, Greg sees an advertisement in the print media for a good or service he is interested in.

Greg dials a phone number provided by the RIP system that could be mentioned in the advertising or otherwise known to Greg, and says an expression corresponding to the advertisement (e.g., "Larry's Market"), such as an expression that the advertisement indicates to be used during the call. The RIP Input Server recognizes the expression provided by Greg, and informs Greg that he will be sent information corresponding to the advertisement to his registered email address.

In a manner similar to that of FIG. 1, the RIP Input Server interacts with the RIP Advertisement Database Server so that it provides the relevant promotional information about Larry's Market to Greg by forwarding the information to Greg's email address, so that Greg can use the obtained information to receive a discount or obtain another benefit.

Figure 4:
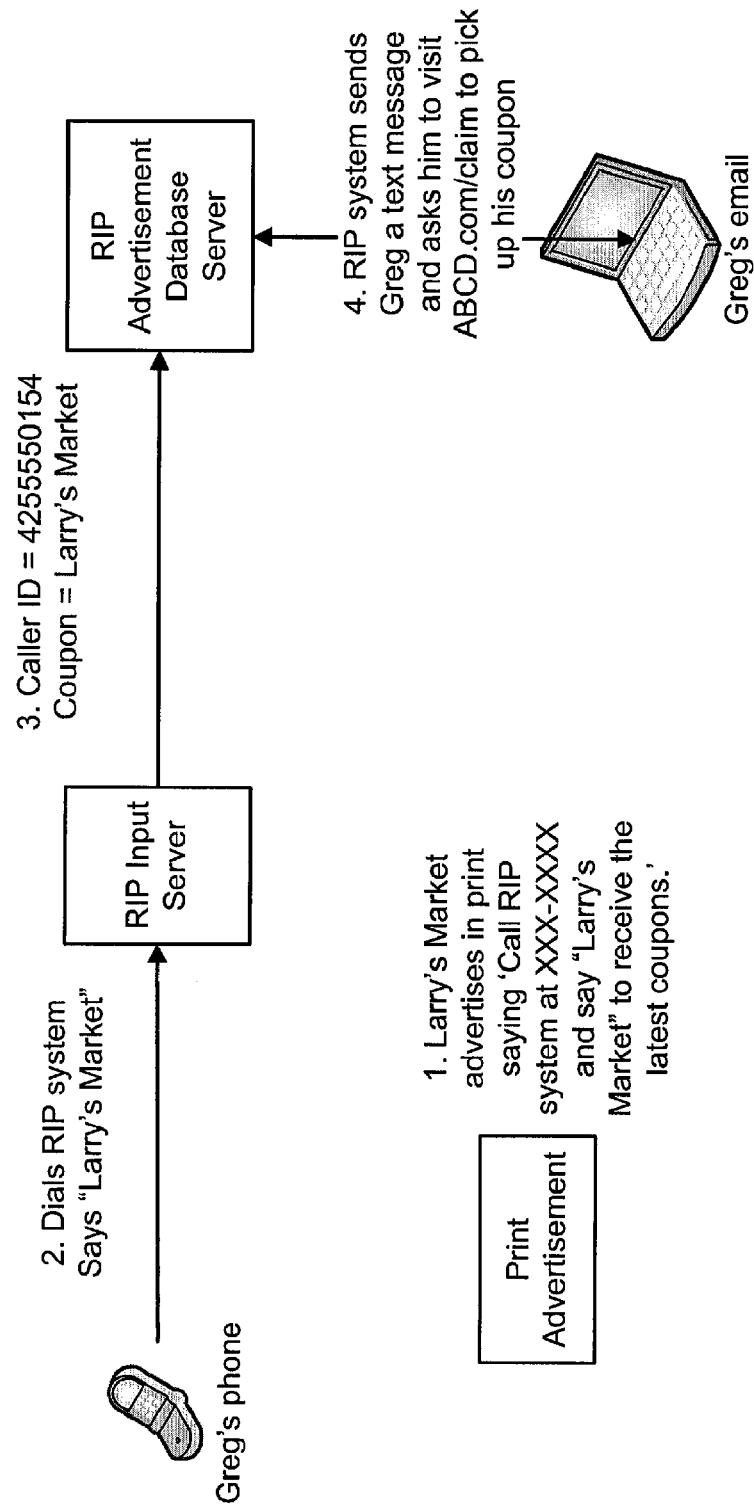

In FIG. 4, the caller user is not a registered RIP system user, similarly to FIG. 2, but in this example is calling in response to an advertisement in print media.

In particular, in this example, Greg sees an advertisement in the print media for a good or service he is interested in.

Greg dials a phone number provided by the RIP system that could be mentioned in the advertising or otherwise known to Greg, and says an expression corresponding to the advertisement (e.g., "Larry's Market"). The RIP Input Server recognizes the expression provided by Greg, but doesn't recognize Greg as a registered user. Therefore, the RIP Input Server tells Greg to visit an indicated electronic location (e.g., a particular indicated part of a Web site) to retrieve the relevant information, in a manner similar to that described with respect to FIG. 2. The RIP Input Server then interacts with the RIP Advertisement Server so that it makes the relevant information available to Greg at an indicated electronic location in a manner similar to that described with respect to FIG. 2, and Greg accesses the indicated electronic location to obtain the relevant information.

Figure 5:
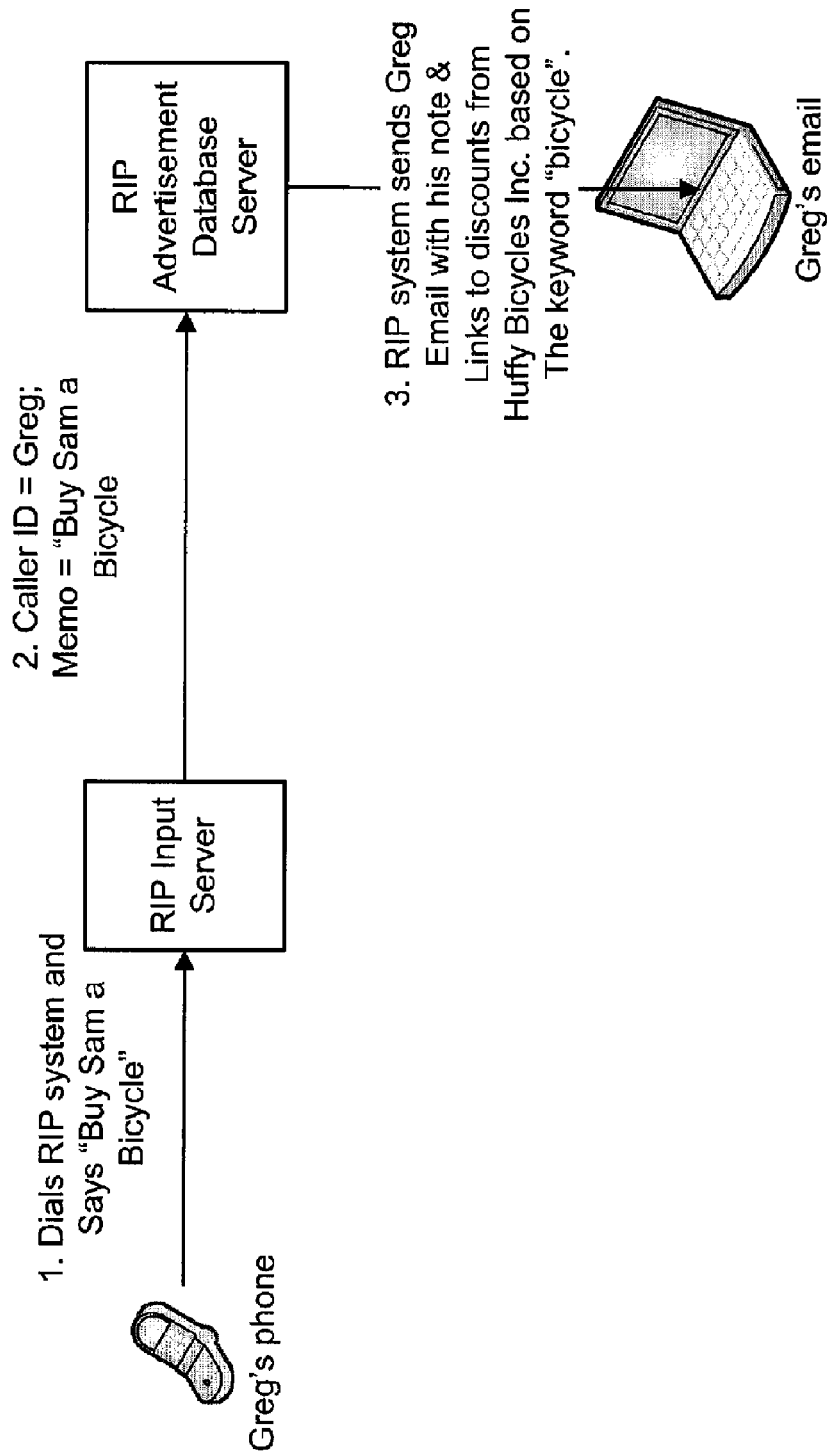

In FIG. 5, the caller user is a registered RIP system user, similarly to FIGS. 1 and 3, but in this example is leaving himself a voice memo to provide a reminder of a later action to take. While the user is not calling to request particular information, the RIP system nonetheless automatically determines relevant information for the user based on the voice-based information in the voice memo. In particular, in this example, the RIP system determines that an advertiser has previously selected an expression with which to associate a particular advertisement or other marketing information, and that the advertiser-selected expression is used by the user in his voice memo. Therefore, the RIP system automatically determines that the advertiser's marketing information is relevant for a current context of the user based on the inclusion of the expression in the user's voice memo, and includes the marketing information along with the voice memo when later providing the voice memo information to the user, or otherwise provides the marketing information to the user. The user can then optionally act upon the advertiser's offer if so desired.

In particular, in this example, Greg dials a phone number provided by the RIP system and leaves himself a voice memo, which in this example is "Buy Sam a bicycle".

RIP Input Server sends this message over to RIP Advertisement Database Server, which analyzes the voice-based information to identify if there are one or more expressions included in the message that correspond to advertiser-selected expressions or that otherwise indicate context information for the user for which relevant information may be identified. In this example, the RIP Advertisement Database Server determines that the expression "bicycle" is an advertiser-selected expression that Huffy Bicycles Inc. has purchased for use with the RIP system. The RIP Advertisement Database Server then sends Greg an email to his registered address with the memo (e.g., as an audio attachment, as text generated by an automated speech-to-text conversion, etc.), as well as with the marketing information specified by Huffy Bicycles Inc. for the "bicycle" expression.

Figure 6:
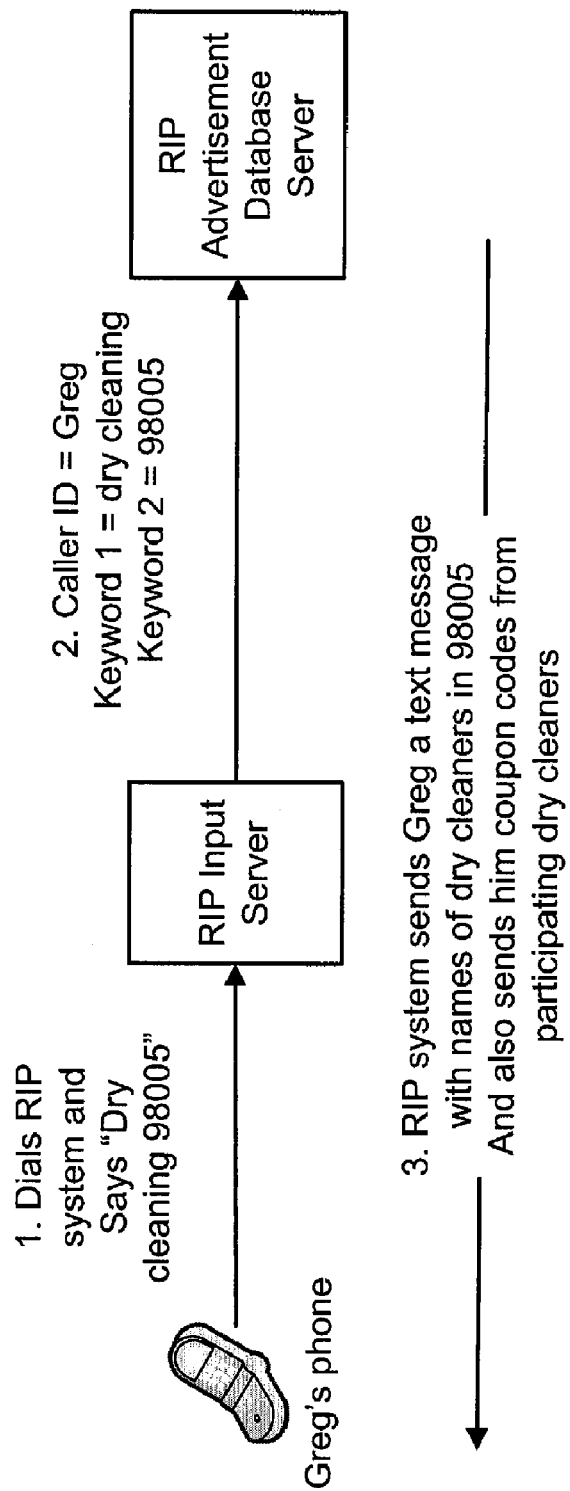

In FIG. 6, the caller user is not a registered RIP system user, similarly to FIGS. 2 and 4, so the RIP system knows at most the number of the phone originating the call, unless the user is prompted to provide identifying information during the call. In this example, the RIP system provides functionality similar to that of directory assistance and/or enhanced directory assistance, so that users may call the RIP system to obtain relevant information of various types. The RIP system may provide relevant information to a caller user in a substantially immediate manner, such as via the same phone call, via a text message or other electronic message to the device used to make the call, via an electronic message to an electronic message address designated by the user, etc.

In particular, in this example, Greg dials a phone number provided by the RIP system, says the expression "Dry Cleaning 98005", and ends the phone call.

In response, the RIP Input Server sends this message over to RIP Advertisement Database Server, which analyzes the voice-based information to identify one or more expressions included in the message. The RIP Advertisement Database Server determines that there are several businesses matching the keywords "Dry Cleaning" and "98005", such as businesses that have previously registered with the RIP system or whose information is otherwise available to the RIP system, and also determines that there are discount coupons associated with a couple of them. In this example, the RIP system sends one or more text messages to Greg's voice device with all the known matches for "Dry Cleaning & 98005", as well as the coupons, although in other situations may send different types of information and/or in a different manner.

In addition, the RIP system may provide various other types of functionality in other embodiments. As one example, advertisements for homes may each include a unique code (e.g., a number, alphanumeric code, etc.) or other expression, and after calling the RIP system and saying the unique expression for a particular house, a user may receive an email with details about that particular house. Similarly, advertisements for new and/or used cars may similarly include unique expressions for each car, and the RIP system may similarly provide details about a particular car to a user after the user calls the RIP system and supplies the unique expression for the car. In addition, a business may create an in-store promotion for particular coupons or other types of information, which may similarly be accessed from the RIP system using unique codes or other expressions. It will be appreciated that the RIP system may similarly provide information for a wide variety of other goods and services.

In some embodiments, the RIP system may operate an advertisement database and a business-to-business commerce engine, allowing businesses to bid on keywords or other expressions with which they would like to associate particular promotional information. For example, businesses may supplement standard directory services information to indicate their relevance to particular expressions and/or to provide additional promotional information, such as by bidding on expressions that are relevant to their business. As one example, Bakkers Drycleaners may bid for "Dry Cleaning" and "98005", so that the business matches all queries that include both (or alternatively one) such expressions. In addition, businesses may specify information to provide to users based on their voice memos to themselves and/or others, such as by similarly indicating particular expressions with which to associate promotional information. In this manner, businesses may associate themselves with expressions other than zip codes and business categories, including expressions that are more general and/or more specific. As one particular example, a retailer may bid for words such as "book", "toys", "music", "Sedaris" (for author David Sedaris), or "P9047" (for promotion P9047). Furthermore, businesses may associate themselves with expressions based on telephone area code locations, such that a local business might be interested only if calls originate from area code 425 rather than area code 415. Alternatively, even a nationwide business may wish to offer special deals in its branches in a particular location, such as if Pizza Hut desires to offer a particular pizza special on calls for expression "pizza" that come from area code 425. In some embodiments, when businesses or other entities specify particular expressions of interest, they may further specify other criteria related to when their promotional information should be provided for those expressions (e.g., only with users' voice memos to themselves, only at certain days/times, only for registered users whose demographic information matches specified information, etc.), while in other embodiments the RIP system may determine to provide such promotional information for any use of a specified expression or more selectively as determined by the RIP system.

Figure 7:
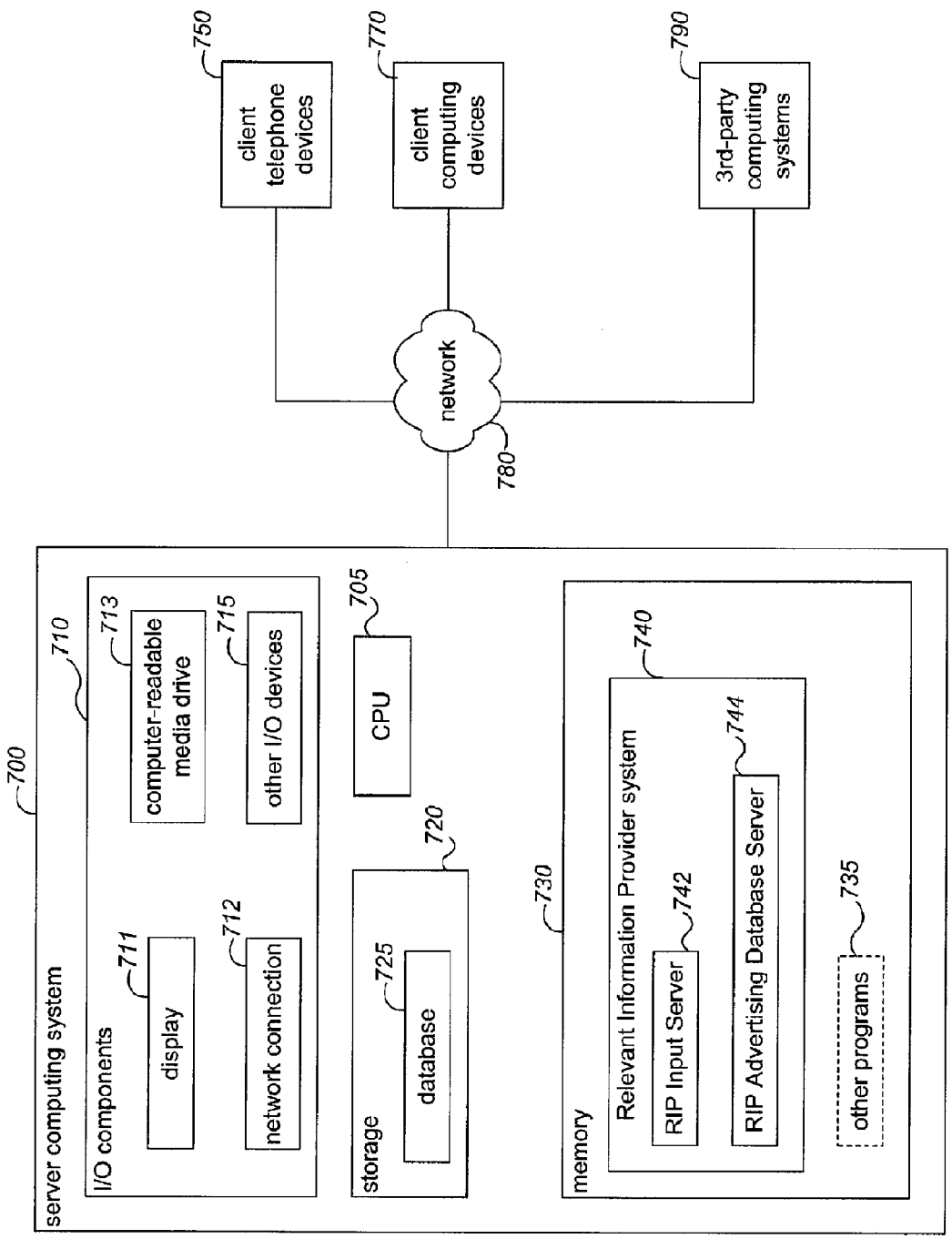
FIGS. 7 and 8A-8B are block diagrams illustrating examples of computing systems suitable for providing users with relevant information in at least some embodiments.
Figure 8A:
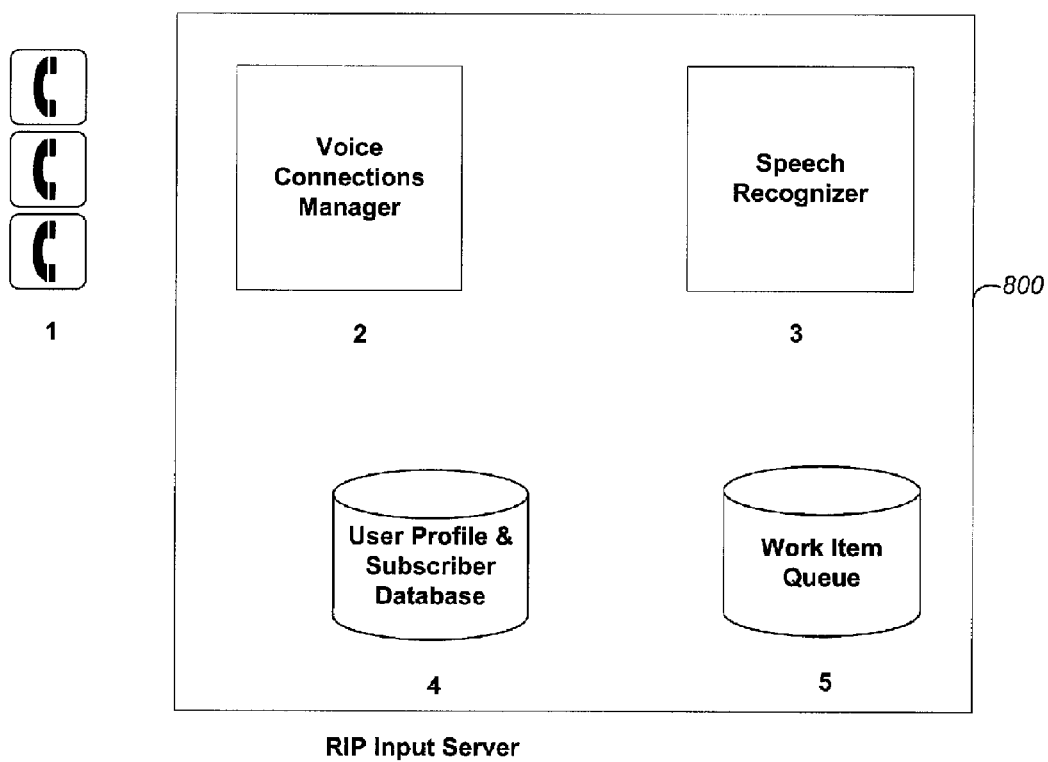
Figure 8B:
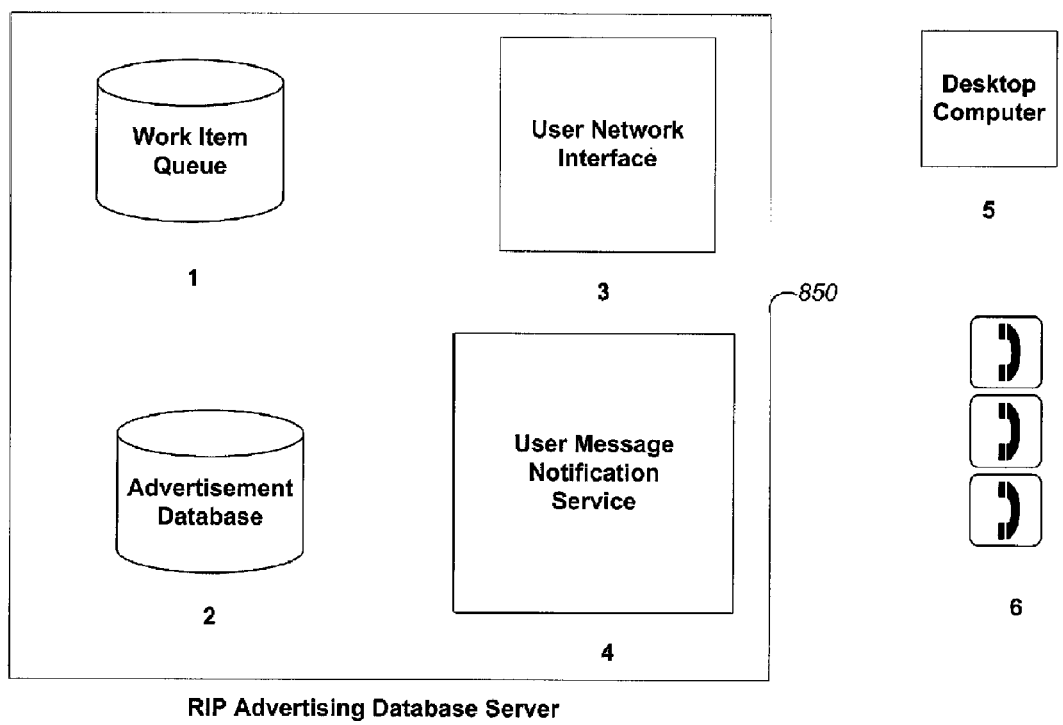

FIGS. 7 and 8A-8B are block diagrams illustrating portions of an embodiment of a RIP system. In particular, FIG. 7 illustrates a high-level overview of an embodiment of the RIP system, FIG. 8A illustrates additional details regarding an embodiment of a RIP Input Server component of the RIP system, and FIG. 8B illustrates additional details regarding an embodiment of a RIP Advertising Database Server component of the RIP system.

FIG. 7 is a block diagram illustrating example computing systems suitable for performing techniques for providing contextually relevant information based on voice-based information in various situations. In particular, FIG. 7 illustrates a server computing system 700 suitable for executing an embodiment of the RIP system 740, as well as various client devices 750 and 770 for interacting with the RIP system, and other computing systems 790 (e.g., systems that may have relevant information available to the RIP system, such as directory information). In the illustrated embodiment, the client devices include telephone-based devices 750 and computing devices 770, such as to allow users to access functionality from the RIP system and to allow advertisers and other entities to specify promotional information corresponding to particular expressions. In some embodiments, at least some devices may have capabilities to act as both devices 750 and 770 (e.g., cell phones that have both voice-based and data-based data retrieval capabilities, computing systems that include microphones and speakers and other components to enable Internet-based or other types of telephone calls to be placed, etc.).

In addition, in this example embodiment, the server computing system 700 has components that include a CPU 705, storage 720, and memory 730, and various I/O components 710, including a display 711, a network connection 712, a computer-readable media drive 713, and other I/O devices 715 (e.g., ports or other connections for one or more incoming telephone lines, a microphone, a speaker, a mouse, keyboard, etc.). The storage 720 includes a database 725 to store various information, such as information about registered users, information about advertisers and other entities who provide promotional information, the promotional information, directory assistance and other relevant information for users, various voice memos and other input supplied by users, etc. Furthermore, in some embodiments, various specialized hardware and/or software components may be included, such as to perform automated speech-to-text and/or text-to-speech conversion. The other devices and systems 750, 770 and 790 each may include similar components to those of the server computing system, but are not illustrated in detail here. Similarly, while not illustrated in FIGS. 8A and 8B, the RIP Input Server component and RIP Advertising Database Server component may each be provided by one or more distinct computing systems (or by a single computing system that provides both), and each such computing system may similarly include various such components.

As noted, an embodiment of an RIP system 740 is executing in memory 730, so as to interact with the client device 750 and 770 over one or more networks 780 (e.g., one or more landline telephone networks, one or more cellular telephone networks, the Internet, etc.) using the network connection 712. In the illustrated embodiment, the RIP system 740 includes an RIP Input Server component 742 and an RIP Advertising Database Server 744, as described in greater detail in FIGS. 8A and 8B. In addition, one or more other programs 735 may optionally be present and executing in memory 730, such as to provide other related functionality (e.g., to obtain payments from advertisers and other entities, to register new users, to provide functionality for advertisers and other entities to bid on keywords and other expressions or otherwise specify promotional information for expressions, etc.). In this embodiment, the RIP system is implemented in part or in whole in software, such as via one or more software components with executable software instructions that are stored in the memory 730 of the server 700 for execution and/or on storage 720 of the server 720.

FIG. 8A illustrates additional details with respect to one example embodiment of a RIP Input Server component 742, which has several sub-components in the example embodiment, as follows:

A Voice Connections Manager component 2, which manages voice connections from external voice sources to the RIP Input Server, including voice input 1 from calls for users (e.g., via landline phone devices, mobile phone devices, other desktop voice input devices, etc.). The Voice Connections Manager component 2 may accept connections in various ways, such as by using standard SS7 (Signaling System 7) signaling and/or Voice over Internet Protocol (using Session Initiation Protocol and similar other technologies), maintains voice calls until the users have completed their interactions, and also obtains and stores caller identification information in at least some embodiments.

A Speech Recognizer component 3, which accepts user voice-based speech input and converts it into text, such as via speech-to-text translation and/or by using human transcriptions. In at least some embodiments, it converts speech into text in a substantially immediate manner (e.g., within a second), or may instead take longer (e.g., a few minutes, hours or days). The Speech Recognizer component 3 may also provide responses back to a user caller through the Voice Connections Manager component 2 in some embodiments, such as to interactively provide information (e.g., promotional information) to the user (e.g., via automatic text-to-speech conversion, or via use of promotional information in recorded audio form).

A Subscriber Database component 4, which contains details of registered users of the RIP system in the illustrated embodiment, such as to store a registered user's email addresses, phone numbers, instant messaging addresses, phone providers and preferences. Various other types of user-specific information may similarly be stored and used in other embodiments.

A Work Item Queue component 5 for use in providing information about interactions with users to the RIP Advertisement Database Server so that the RIP Advertisement Database Server can perform further functionality of the RIP system corresponding to those interactions, although in other embodiments a single server system may provide functionality of both the RIP Input Server and the RIP Advertisement Database Server. In this example embodiment, some or all user interactions with the RIP Input Server will be sent to the RIP Advertisement Database Server in a reliable fashion using the Work Item Queue component 5, which ensures that an item has been accepted by another component before deleting the item from the queue. In some embodiments, the Work Item Queue component 5 may further accept work items to be handled by the RIP Input Server, such as from the RIP Advertising Database Server.

FIG. 8B illustrates additional details with respect to one example embodiment of a RIP Advertising Database Server component 744, which has several sub-components in the example embodiment, as follows:

A Work Item Queue component 1 for use in obtaining information about interactions with users from the RIP Input Server so that the RIP Advertisement Database Server can perform further functionality of the RIP system corresponding to those interactions. In particular, in this illustrated embodiment, some or all user interactions are each encapsulated as a separate work item that may be exchanged between various components. In some embodiments, the Work Item Queue component 1 may further be used for reliably sending work items to other components, including the RIP Input Server.

An Advertisement Database component 2 for use in storing marketing and other promotional information for advertisers and other entities, as well as corresponding keywords and other expressions for the promotional information (e.g., expressions that are purchased or otherwise selected by the entities). Types of expressions associated with promotional material may vary in various embodiments so as to include words and phrases at varying levels of specificity and of various types.

A User Network Interface component 3 for use in providing information to users over one or more networks, such as over the Internet and/or over a voice-based telephone network. In the illustrated embodiment, both registered and unregistered users may access information of various types, such as a voice memo that they previously saved (or was saved for them by someone else) or promotional information that they requested or that was otherwise automatically determined to be relevant for them. In some embodiments, some or all information may be provided to at least some types of users (e.g., registered users, all users, etc.) in other ways, such as via one or more electronic messages sent to the users.

A Notification Service component 4 for determining relevant information for users, such as by matching expressions in user speech input (e.g., voice memos, requests for additional information corresponding to advertisements or for directory services information, etc.) to content in the advertising database.

One or more client data devices 5, such as desktop computers, for use by users in accessing information from the RIP system via the User Network Interface component 3 over a data network. For example, a client device 5 may be a standard desktop computer executing any operating system and Web browser, and optionally including a voice interface and/or executing one or more instant messaging clients.

One or more client phone devices 6 for use by users in accessing information from the RIP system via the User Network Interface component 3 over a phone network. For example, a client phone device may be a landline or mobile phone that can receive voice signaling and content, and optionally text messages.

It will be appreciated that the illustrated computing systems and devices 700, 750, 770 and 70 are merely illustrative and are not intended to limit the scope of the present invention. The computing systems and devices may be connected to other devices that are not illustrated, including through one or more networks. More generally, a "client" or "server" system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated RIP system may in some embodiments be distributed in more or less components than shown, and in some embodiments more or less functionality than is illustrated may be provided.

In addition, while various items may be stored in memory or on storage while being used, these items or portions of them can be transferred between memory and other storage devices for purposes of memory management and/or data integrity. Alternatively, in other embodiments some or all of the software components may execute in memory on other devices or systems and communicate with the computing system(s) via inter-computer communication. Furthermore, in some embodiments, some or all of the system components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 15:
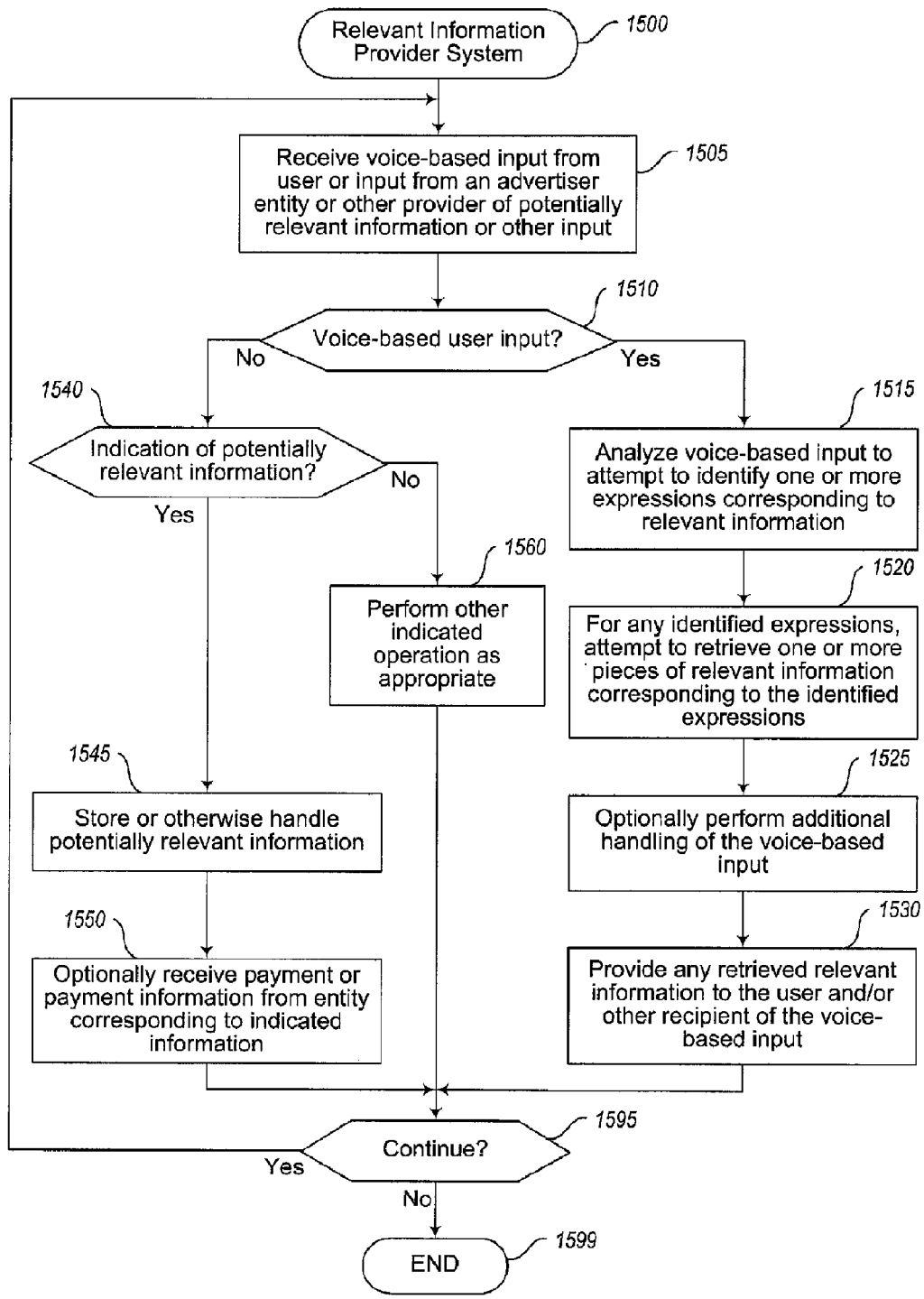
FIG. 15 is a flow diagram of an example embodiment of a Relevant Information Provider routine.

FIG. 15 illustrates a flow diagram of an example embodiment of a Relevant Information Provider system routine 1500. The routine may be provided by, for example, execution of an embodiment of the RIP system, as described in greater detail elsewhere.

The routine begins at step 1505, where an indication is received of input to the routine, such as voice-based input from a user, an interaction with an advertiser or other entity to provide promotional material, or other type of interaction. The routine continues to step 1510 to determine if voice-based input is received from a user (e.g., a voice memo, a request for particular information, etc.), and if so continues to step 1515 to analyze the voice-based input to attempt to identify one or more expressions that correspond to relevant available information. In some embodiments, the routine may further attempt to identify whether the user is a registered user, or to otherwise gather information from the user (if step 1515 occurs as part of an interactive connection with the user, rather than the processing of previously received voice-based input) related to providing relevant information to the user. In step 1520, the routine then attempts to retrieve one or more pieces of relevant information (e.g., one or more pieces of promotional information from one or more advertisers) that correspond to each of the expressions identified in step 1515, and in step 1525 optionally performs additional handling of the received voice-based input (e.g., to store a voice memo for later retrieval by a user, to automatically transcribe a voice-based memo to text, etc.). In step 1530, the routine then provides any retrieved relevant information to the user and/or one or more other recipients of the voice-based input (e.g., during a telephone call in which the voice-based input was received, by sending one or more electronic messages, by storing the information in a network-accessible location and providing access information for that location to the user, etc.), and optionally also provides information corresponding to the voice-based input (e.g., a text transcription).

If it was instead determined in step 1510 that voice-based input from a user was not received, the routine continues instead to step 1540 to determine whether promotional or other potentially relevant information was received in step 1505 from an advertiser or other entity, and if so continues to step 1545 to store or otherwise handle the information for later use. After step 1545, the routine in this example embodiment continues to step 1550 to optionally receive payment (e.g., corresponding to a one-time fee, or a prepayment on later fees to be accrued) or payment information corresponding to the provided information. While not illustrated here, in at least some embodiments and situations, entities may be charged for some or all instances in which their provided information is provided to a user, such as to correspond to a form of pay-per-call advertising.

If it was instead determined in step 1540 that promotional or other potentially relevant information was received in step 1505, the routine continues to step 1560 to perform one or more other indicated actions as appropriate (e.g., related to registering users; registering advertisers and other entities; providing access to users and/or entities about prior interactions with the RIP system, including access to voice memos; etc.). After steps 1530, 1550, or 1560, the routine continues to step 1595 to determine whether to continues. If so, the routine returns to step 1505, and if not continues to step 1599 and ends.

FIGS. 9-14 illustrate examples of information flow that may occur in some embodiments, and in particular to correspond to the example scenarios of FIGS. 1-6.

Figure 9:
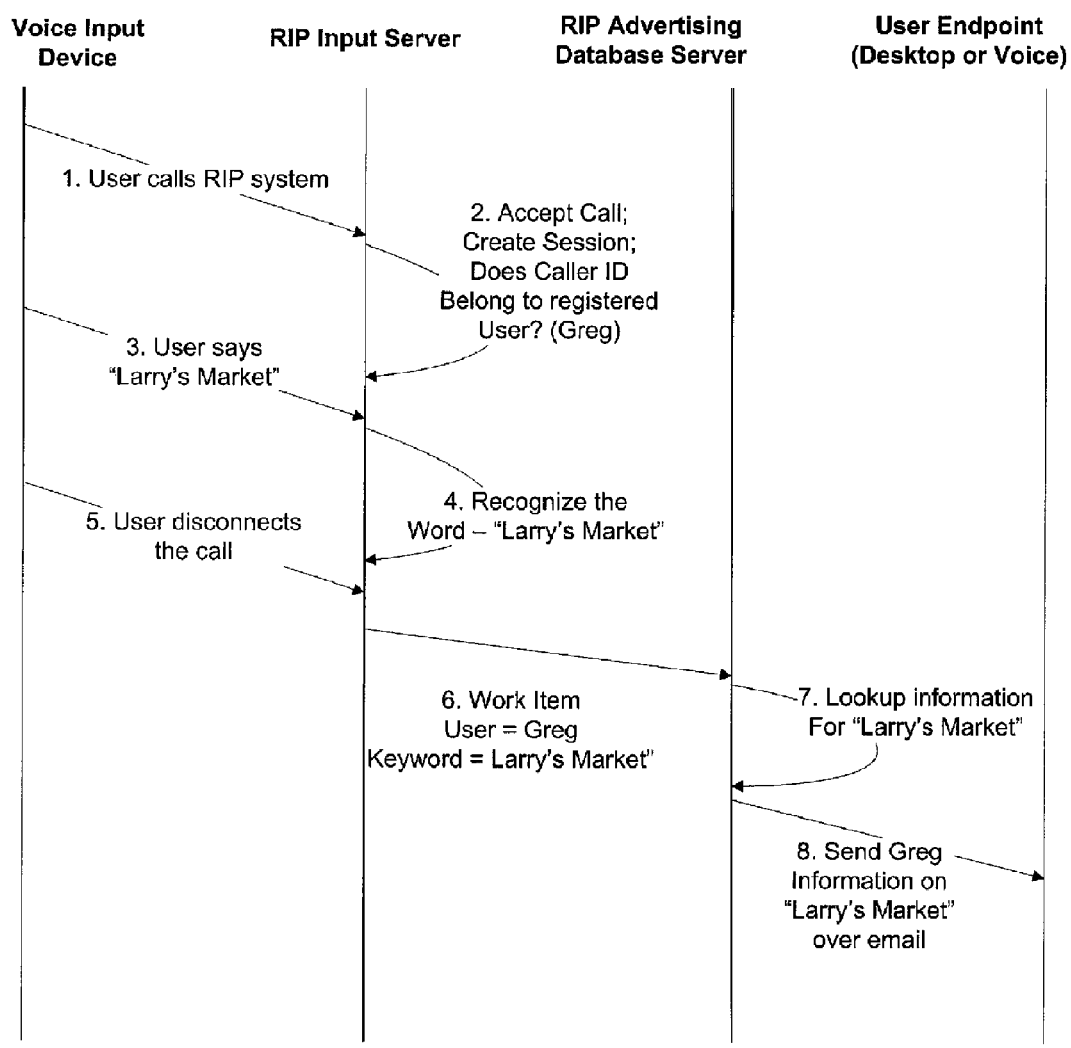
FIGS. 9-14 illustrate examples of some types of data exchanged when providing users with relevant information.

FIG. 9 illustrates an example information flow that corresponds to Scenario 1 illustrated in FIG. 1. In that scenario, a registered user is reacting to an advertisement in a broadcast medium such as radio or television (e.g., over airwaves, Internet-based, satellite-based, etc.). In this example, the flow is as follows:

1. After the user sees the advertisement, the user contacts the RIP system, such as by calling an appropriate telephone number, or in other embodiments by using a URL ("Uniform Resource Locator") or other URI ("Uniform Resource Identifier"). As one illustrative example, a user may contact the RIP system using a connection based on an SIP ("Session Initiation Protocol") URI, such as over a voice connection initiated by placing a telephone call using an SIP URI "phone number" (e.g., sip:<username>@<host>:port, where <username> is replaced by an actual username and <host> is replaced by a domain name or IP address, such as john.smith@212.111.1.111 or support@abcdefgh.com), as described in greater detail in the RFC 3261 standard.

2. The RIP Input Server accepts the call and creates a corresponding session. It also checks if the caller ID number (e.g., "4255550154") maps to a registered user. If it does, as in this case by mapping the caller ID to user Greg, it associates the session with this information.

3. The user says the expression "Larry's Market" as prompted by the advertisement.

4. The RIP Input Server recognizes the expression "Larry's Market", and in the illustrated embodiment indicates to the user that it recognized the expression.

5. The user disconnects the call.

6. The RIP Input Server sends the expression "Larry's Market" and an indication of the user identification of Greg to the RIP Advertising Database Server.

7. The RIP Advertising Database Server retrieves the promotional information associated with the expression "Larry's Market" (in this case, particular marketing materials).

8. The RIP Advertising Database Server sends the promotional information to the user's email account.

Figure 10:
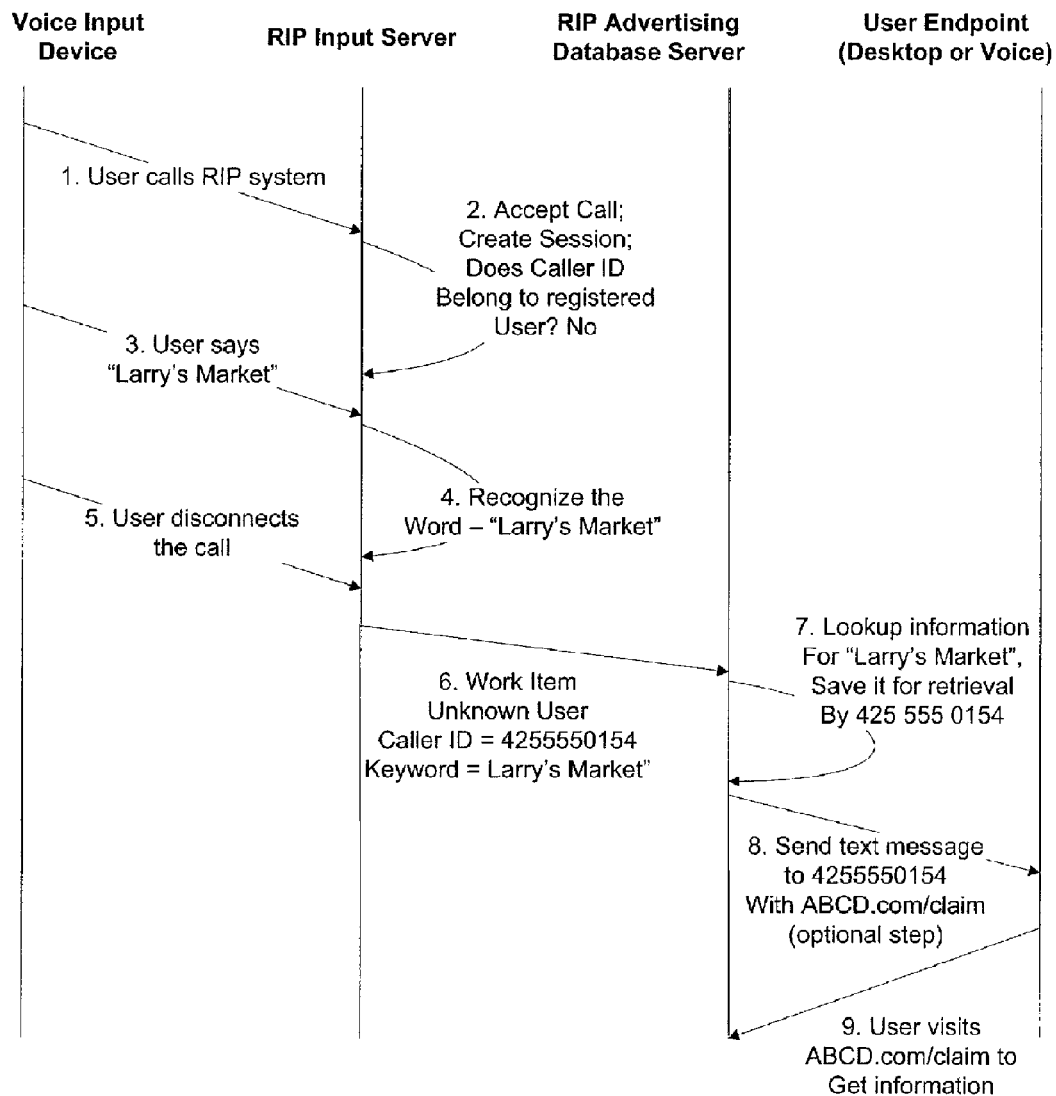

FIG. 10 illustrates an example information flow that corresponds to Scenario 2 illustrated in FIG. 2. In that scenario, an unregistered user is reacting to an advertisement in a broadcast medium such as radio or television. In this example, the flow is as follows:

1. After the user sees the advertisement, the user contacts the RIP system in a manner similar to that described with respect to FIG. 9.

2. The RIP Input Server accepts the call and creates a corresponding session. It also checks if the caller ID 4255550154 maps to a registered user. If it does not, such as in this example, the RIP Input Server associates the session with the caller ID number.

3. The user says the expression "Larry's Market" as prompted by the advertisement.

4. The RIP Input Server recognizes the expression "Larry's Market", and in the illustrated embodiment indicates to the user that it recognized the expression.

5. The user disconnects the call.

6. The RIP Input Server sends the expression "Larry's Market" and an indication of the caller ID information (e.g., "4255550154") to the RIP Advertising Database Server.

7. The RIP Advertising Database Server retrieves the promotional information associated with the expression "Larry's Market" (in this case, particular marketing materials), and saves it under a particular network-accessible location (e.g., a location corresponding to a ABCD.com/claim URL) to be made available to the user.

8. The RIP Advertising Database Server optionally sends a text message to the phone number of the user's phone (e.g., as identified via caller ID information) to indicate the location of the promotional information, or instead may provide the information to the user in another manner (e.g., verbally during the telephone call).

9. The user accesses the indicated network location (e.g., via a Web browser on an appropriate computing device) and enters his phone number to retrieve the information stored on his behalf. If the information is to be made available only to the user who called in and/or to the owner of that phone number (e.g., if it is of some immediate monetary value, has privacy associated with it, etc.), then in some embodiments the information may not be made available to the user until ownership of the phone ownership is authenticated in some manner.

Figure 11:
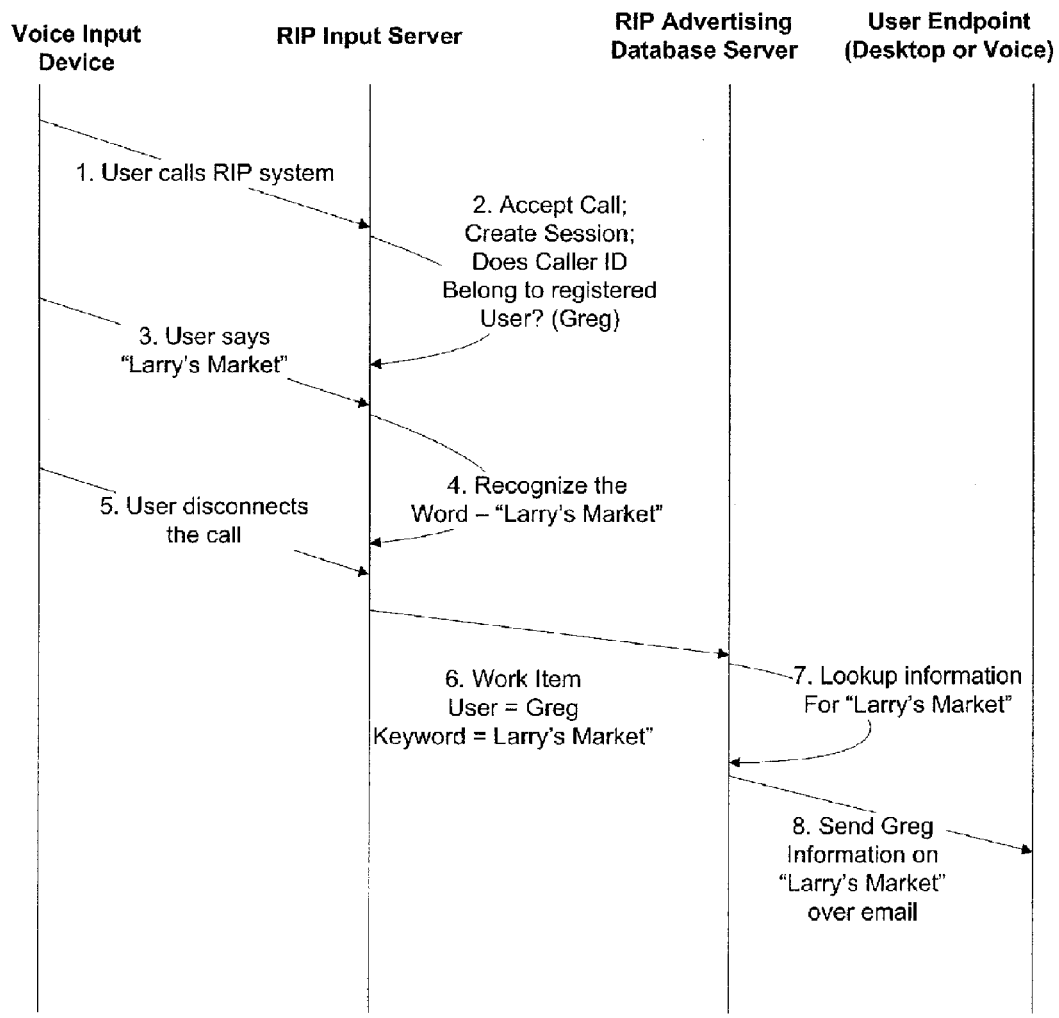

FIG. 11 illustrates an example information flow that corresponds to Scenario 3 illustrated in FIG. 3, in which a registered user is reacting to an advertisement in a print medium (newspapers, magazines, etc.). In this example, the flow is as follows:

1. After the user sees the advertisement, the user contacts the RIP system in a manner similar to that described with respect to FIG. 9.

2. The RIP Input Server accepts the call and creates a corresponding session. It also checks if the caller ID number maps to a registered user, which in this case it does, and associates the session with the corresponding identification of the user Greg in a manner similar to that described with respect to FIG. 9.

3. The user says the expression "Larry's Market" as prompted by the advertisement.

4. The RIP Input Server recognizes the expression "Larry's Market", and in the illustrated embodiment indicates to the user that it recognized the expression.

5. The user disconnects the call.

6. The RIP Input Server sends the expression "Larry's Market" and an indication of the user identification of Greg to the RIP Advertising Database Server.

7. The RIP Advertising Database Server retrieves the promotional information associated with the expression "Larry's Market" (in this case, particular marketing materials).

8. The RIP Advertising Database Server sends the promotional information to the user's email account.

Figure 12:
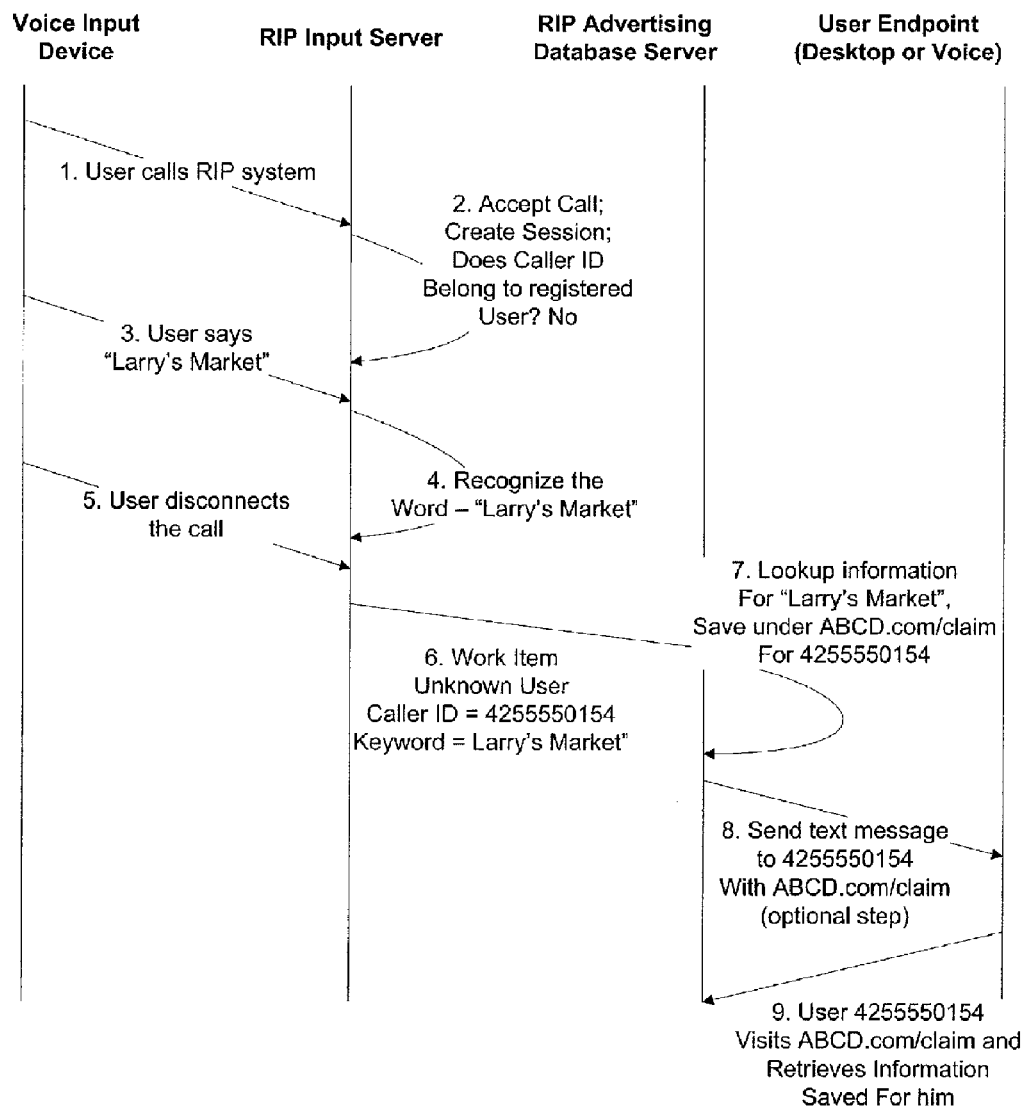

FIG. 12 illustrates an example information flow that corresponds to Scenario 4 in FIG. 4. In that scenario, an unregistered user is reacting to an advertisement in a print medium (newspapers, magazines, etc.). In this example, the flow is as follows:

1. After the user sees the advertisement, the user contacts the RIP system in a manner similar to that described with respect to FIG. 9.

2. The RIP Input Server accepts the call and creates a corresponding session in a manner similar to that discussed above with respect to FIG. 10.

3. The user says the expression "Larry's Market" as prompted by the advertisement.

4. The RIP Input Server recognizes the expression "Larry's Market", and in the illustrated embodiment indicates to the user that it recognized the expression.

5. The user disconnects the call.

6. The RIP Input Server sends the expression "Larry's Market" and an indication of the caller ID information to the RIP Advertising Database Server in a manner similar to that of FIG. 10.

7. The RIP Advertising Database Server retrieves the promotional information associated with the expression "Larry's Market" (in this case, particular marketing materials), and saves it in a particular network-accessible location (e.g., a location corresponding to a ABCD.com/claim URL) to be made available to the user in a manner similar to that of FIG. 10.

8. The RIP Advertising Database Server optionally sends a text message to the phone number of the user's phone to indicate the location of the promotional information or otherwise provides the information to the user, in a manner similar to that of FIG. 10.

9. The user accesses the indicated network location (e.g., via a Web browser on an appropriate computing device) and enters his phone number to retrieve the information stored on his behalf. If the information is to be made available only to the user who called in and/or to the owner of that phone number (e.g., if it is of some immediate monetary value, has privacy associated with it, etc.), then in some embodiments the information may not be made available to the user until ownership of the phone ownership is authenticated in some manner, in a manner similar to that of FIG. 10.

Figure 13:
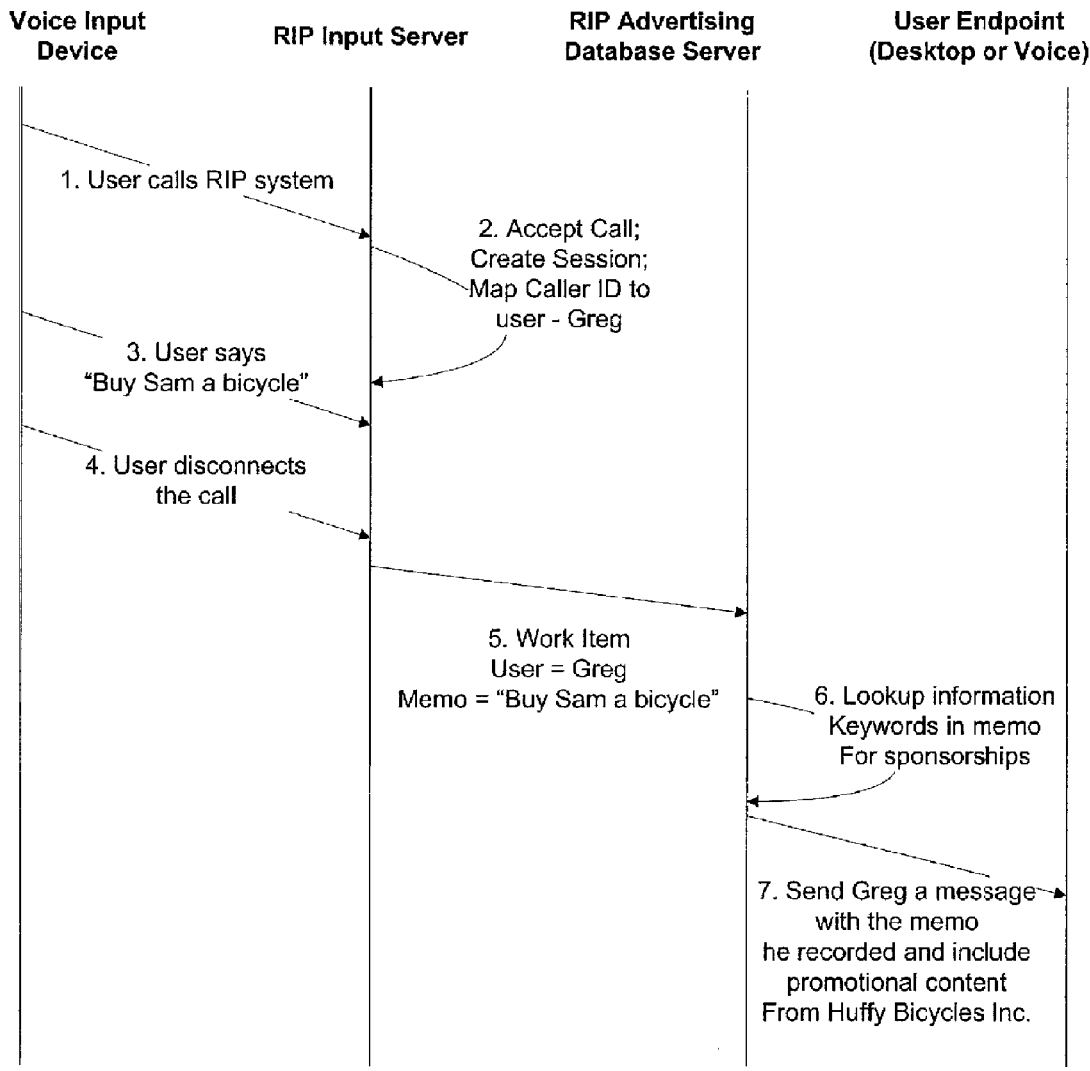

FIG. 13 illustrates an example information flow that corresponds to Scenario 5 illustrated in FIG. 5, in which a registered user contacts the RIP system to leave a voice memo. In this example, the flow is as follows:

1. After the user sees the advertisement, the user contacts the RIP system in a manner similar to that described with respect to FIG. 9.

2. The RIP Input Server accepts the call and creates a corresponding session. It also checks if the caller ID number maps to a registered user, which in this case it does, and associates the session with the corresponding identification of the user Greg in a manner similar to that described with respect to FIG. 9.

3. The user records a voice memo, which in this example is "buy Sam a bicycle".

4. The user disconnects the call.

5. The RIP Input Server transcribes the voice memo and sends a corresponding work item to the RIP Advertising Database Server, such as with a textual version of the transcribed voice memo and an indication of the user identification of Greg in a manner similar to that described with respect to FIG. 9.

6. The RIP Advertising Database Server receives the memo, and determines whether the contents match any expressions in the database that are associated with promotional information. If relevant promotional information is determined for any such expressions, the RIP Advertising Database Server appends it to the memo transcription to be provided to the user. In this example, the RIP Advertising Database Server determines that Huffy Bicycles Inc. has a relevant promotion.

7. The RIP Advertising Database Server sends the memo and the appended promotional information to the user's email account.

Figure 14:
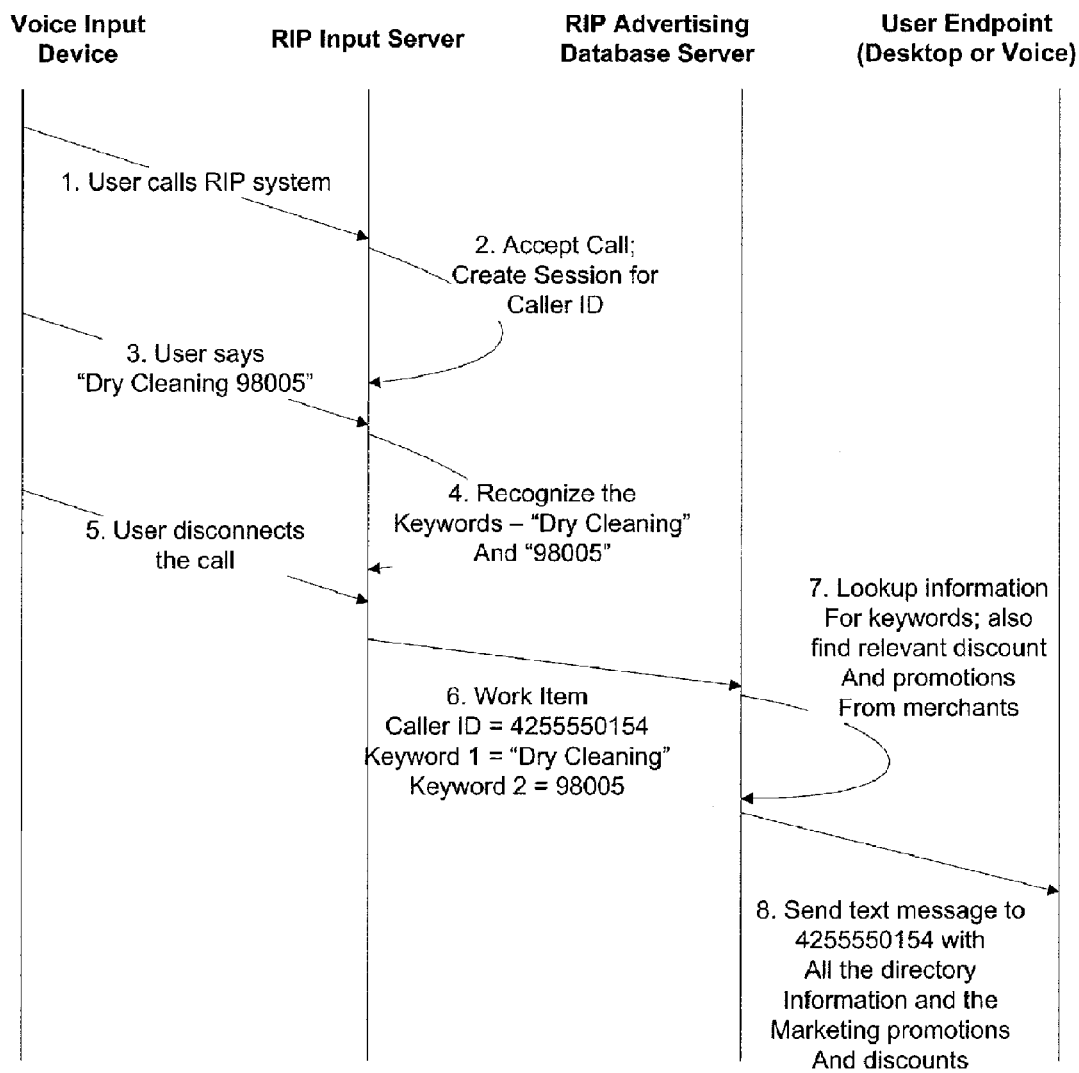

FIG. 14 illustrates an example information flow that corresponds to Scenario 6 in FIG. 6, in which an unregistered user contacts the RIP system to obtain directory assistance information. In this example, the flow is as follows:

1. The user contacts the RIP system in a manner similar to that described with respect to FIG. 9.

2. The RIP Input Server accepts the call and creates a corresponding session in a manner similar to that discussed above with respect to FIG. 10.

3. The user says the expression corresponding to the type of directory assistance information that he desires, which in this example is "Dry Cleaning, 98005".

4. The RIP Input Server recognizes the expression, and in this example repeats it back to the user for validation.

5. The user disconnects the call and awaits the search results.

6. The RIP Input Server send the collected information to the RIP Advertising Database Server, which in this example includes keywords "Dry Cleaning" and "98005", as well as an indication of the caller ID information in a manner similar to that of FIG. 10.

7. The RIP Advertising Database Server receives the keywords, and determines whether the keywords match any stored directory information in the database as well as any expressions in the database that are associated with promotional information (e.g., a drycleaner in zip code 98005 who is offering a 25% discount).

8. The RIP Advertising Database Server sends all this information back as a text message to the voice device based on the caller ID information, although in other embodiments may provide the information to the user in other manners (e.g., by saving it in a particular network-accessible location to be made available to the user in a manner similar to that of FIG. 10).

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

We claim:

1. A method for a computing device in a voice-based service to provide relevant promotional material based on spoken information, the method comprising:
   receiving, for the voice-based service, a voice recording that is provided by a user using a mobile device;
   automatically transcribing the voice recording via speech-to-text translation in order to produce a text memo; and
   responding to the user by:
      analyzing contents of the text memo to identify an expression present in the text memo, the expression comprising at least one word and being associated with one or more pieces of promotional material;
      selecting a piece of promotional material relevant to the identified expression; and
      sending the selected piece of promotional material with a portion of the text memo to the user in an electronic message, wherein the user has previously registered with the voice-based service and provided the voice-based service with one or more electronic message addresses for the user to which the electronic message is sent.

2. The method of claim 1 wherein the voice-based service provides functionality to multiple users, and wherein receiving the voice recording provided by the user includes receiving a telephone call from the user and generating the voice recording during the telephone call.

3. The method of claim 2 wherein the user has previously provided the voice-based service with demographic information specific to the user, and wherein the piece of promotional information is selected based at least in part on the previously-provided demographic information specific to the user.

4. The method of claim 1 wherein the electronic message is an email message, an instant message, or a text message.

5. The method of claim 1 wherein sending promotional material with a portion of the text memo includes storing the promotional material together with at least a portion of the text memo in such a manner that the promotional material is provided together with the at least a portion of the text memo to the user.

6. The method of claim 1 wherein the piece of promotional material includes a coupon and/or a promotional code.

7. The method of claim 1 wherein the piece of promotional material includes an advertisement for a product and/or service.

8. The method of claim 1, further comprising providing, in the electronic message, an audio version of at least a portion of the voice recording in conjunction with the provided portion of the text memo and the provided promotional material.

9. The method of claim 8 wherein the promotional material is provided to the user in an audible format.

10. A non-transitory machine-readable storage medium whose contents enable a computing system in a voice-based service to provide relevant promotional material based on spoken information, by performing a method comprising:
    receiving, for the voice-based service, a voice recording that is provided by a user via a mobile device, the voice recording including an expression having at least one word;
    automatically transcribing the voice recording received from the user via speech-to-text translation in order to generate textual information; and
    responding to the user by:
       analyzing the textual information to identify an included expression;
       selecting promotional information relevant to the identified expression; and
       sending the selected promotional information with a portion of the textual information to the user in an electronic message, wherein the user has previously registered with the voice-based service and provided the voice-based service with one or more electronic message addresses for the user to which the electronic message is sent.

11. The machine-readable storage medium of claim 10 wherein the voice-based service provides functionality to multiple users and to multiple advertisers, the multiple advertisers each specifying one or more expressions and, for each specified expression, providing relevant information about an advertised product that is associated with the specified expression, so that an identified expression in a voice recording provided by a user is matched to a corresponding specified expression from an advertiser and causes that user to receive the relevant information associated with the advertised product.

12. A computing system in a voice-based service configured to provide relevant information based on spoken information, comprising:
    a memory storing computer executable instructions of:
       a first component configured to:
          receive, for the voice-based service, a voice recording from user using a mobile device; and
          transcribe the voice recording using speech-to-text translation in order to generate a textual representation of the voice recording; and
       a second component configured to send relevant information to the user of the mobile device by:

analyzing the textual representation of the voice recording to identify an expression, the expression comprising one or more words;

selecting a piece of relevant information to provide to the user based on the identified expression; and sending the selected piece of relevant information with a portion of the textual representation to the user in an electronic message, wherein the user has previously registered with the voice-based service and provided the voice-based service with one or more electronic message addresses associated with the user; and a processor for executing the computer-executable instructions stored in the memory.

13. The computing system of claim 12 wherein the second component is further configured to store the relevant information together with at least a portion of the textual representation such that the relevant information is provided together with the portion of the textual representation to the user.

14. The computing system of claim 12 wherein the voice recording received from the user is a voice message.

15. The computing system of claim 12 wherein the identified expression is an expression previously indicated by an advertiser to be associated with an advertised product, and wherein the selected piece of relevant information includes information about the advertised product.

16. The computing system of claim 12 wherein the electronic message is an email message, an instant message, or a text message.

17. The computing system of claim 12 wherein the selected piece of relevant information includes a piece of promotional material.

18. The computing system of claim 17 wherein the piece of promotional material includes a coupon and/or a promotional code.

19. The computing system of claim 17 wherein the promotional material is provided to the user in an audible format.

20. The computing system of claim 12 wherein the first component is further configured to receive a telephone call from the user and to generate the voice recording during the telephone call.

* * * * *